Figure 1:
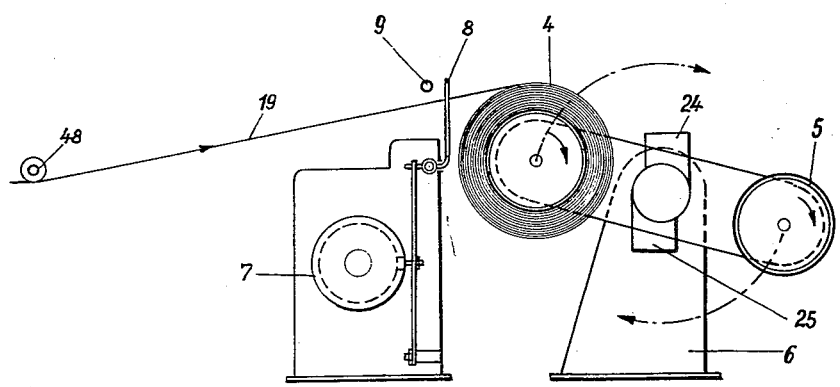

Nov. 27, 1956  L. HERELE ET AL  2,772,054
WINDING DEVICE

Filed Dec. 8, 1953  5 Sheets-Sheet 1

INVENTORS

Nov. 27, 1956    L. HERELE ET AL    2,772,054
WINDING DEVICE
Filed Dec. 8, 1953    5 Sheets-Sheet 2
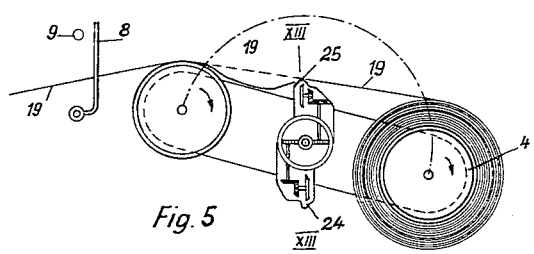
Fig. 5
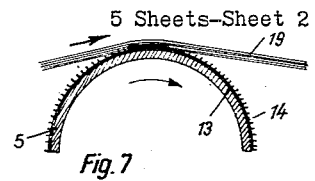
Fig. 7
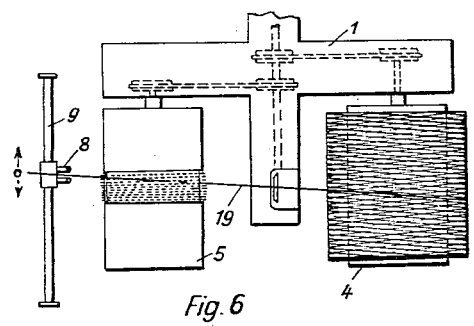
Fig. 6
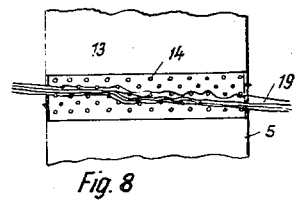
Fig. 8
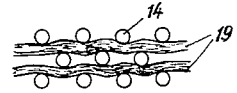
Fig. 9
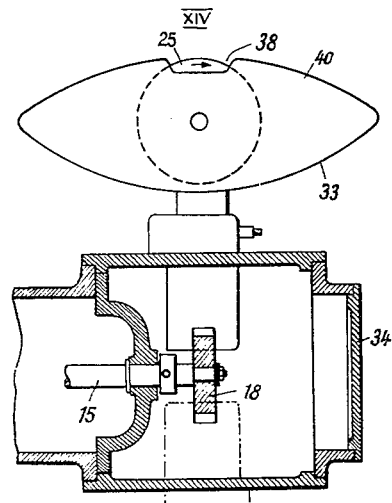
Fig. 10
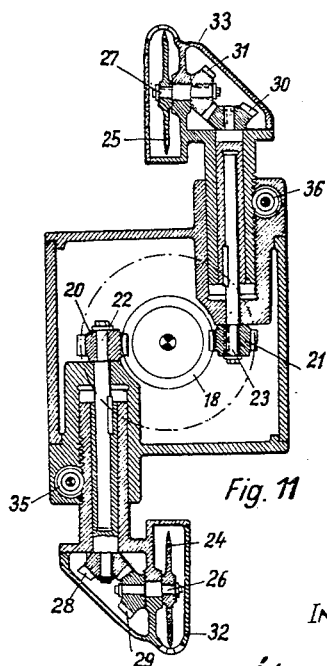
Fig. 11
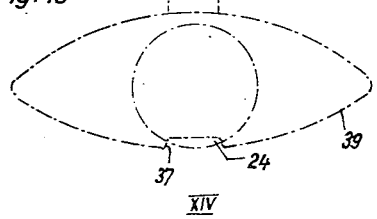
INVENTORS
by
Pierce, Scheffler & Parker

United States Patent Office 2,772,054
Patented Nov. 27, 1956

2,772,054

WINDING DEVICE

Ludwig Herele, Bobingen, and Friedrich Ihls, Munich, Germany, assignors to Farbwerke Hoechst Aktiengesellschaft vormals Meister Lucius & Bruning, a corporation of Germany Application December 8, 1953, Serial No. 396,986

6 Claims. (Cl. 242—18)

This is a continuation-in-part of patent application Ser. No. 260,812 entitled "Winding Device," filed December 10, 1951, now abandoned.

This invention relates to a non-stop automatic transfer winding apparatus for continuously winding filament cables and more particularly thick tows delivered at a high speed from a set of spinnerets in the form of a large number of parallel filaments of a high strength consisting, e. g., of polyamide or polyacryl nitrile.

It is an object of the present invention to provide a mechanism permitting automatic changing of the winding carriers and uninterrupted, continuous winding even during the changing operation.

A special object of the present invention is to provide an apparatus of the type referred to which is of a simple construction and operation.

Another object of the invention is to provide means for automatically severing the textile cable and transferring the leading end from the full to the empty bobbin.

Another object of the invention is to provide means for safely cutting and gripping the cable without requiring complicated mechanism for synchronizing the cutting and gripping operations.

A still further object of the invention is to provide means ensuring a smooth changeover and preventing tearing or undue stretching of the filaments during and immediately after the transferring operation.

Other objects of the invention are such as may be attained by a utilization of the various combinations and principles hereinafter set forth in the varied relations to which they are obviously applicable by those skilled in the art.

The invention will be best understood and further objects will appear from a study of the following detailed description taken in connection with the accompanying drawings, with the understanding, however, that the invention is not confined to any strict conformity with the showing in the drawings, but may be changed and modified as long as such changes mark no material departure from the salient features of the invention as expressed in the appended claims.

Figures 3, 4:
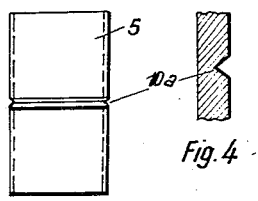
Figure 2:
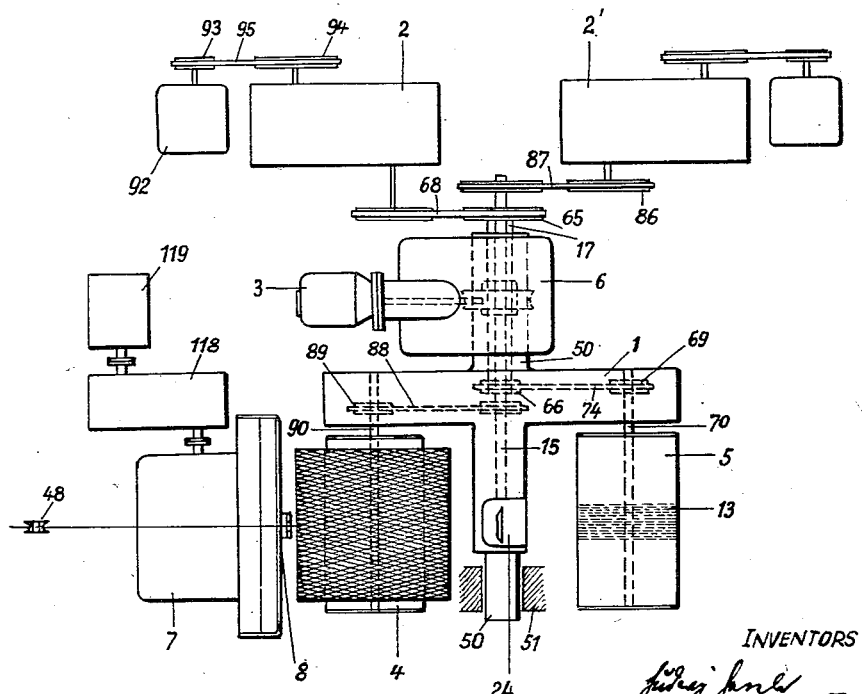
Figure 12:
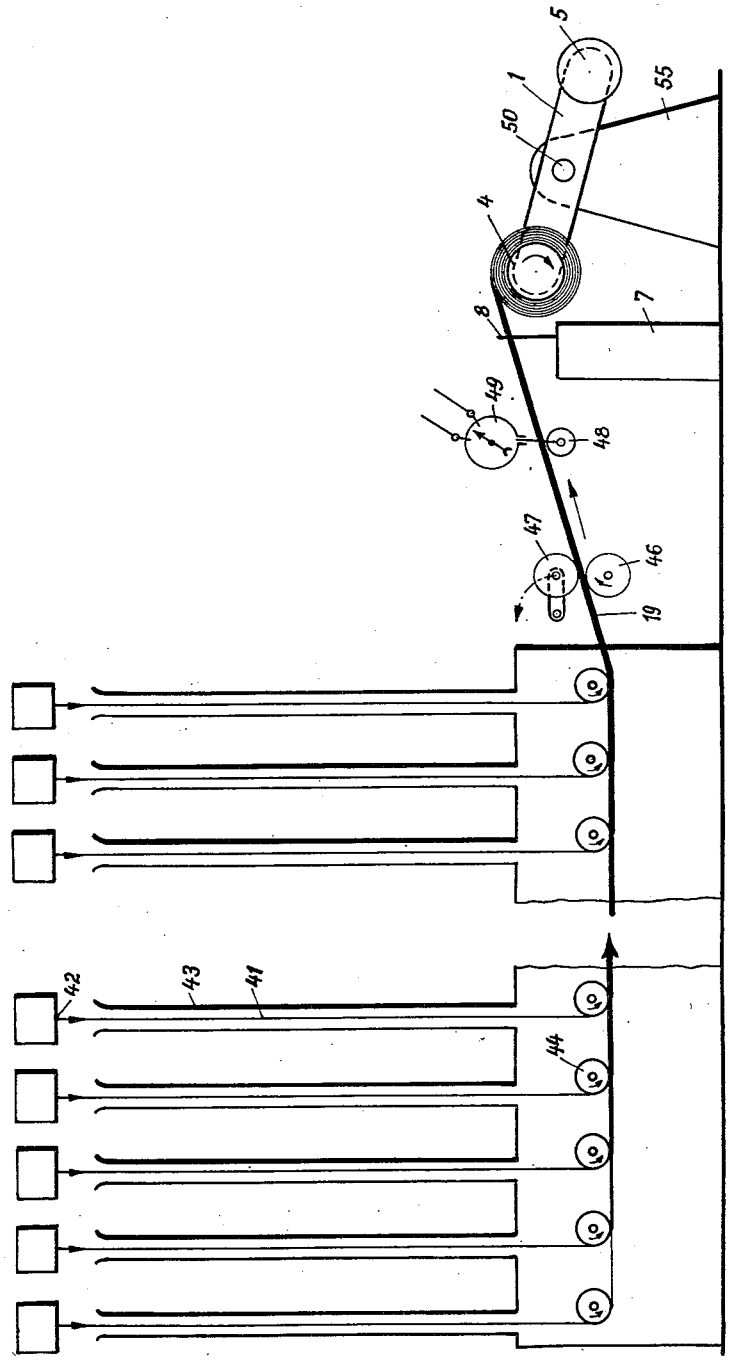
Figure 13:
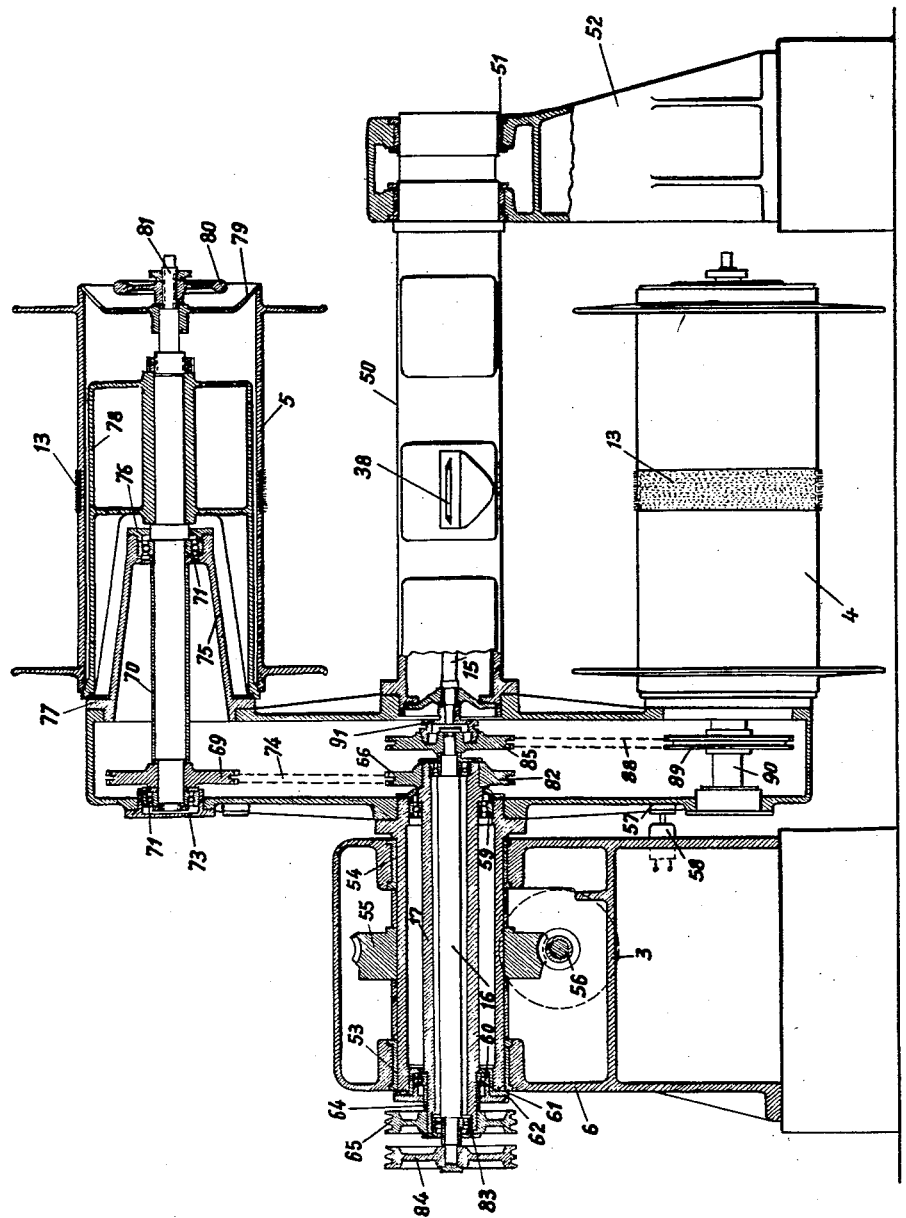
Figure 14:
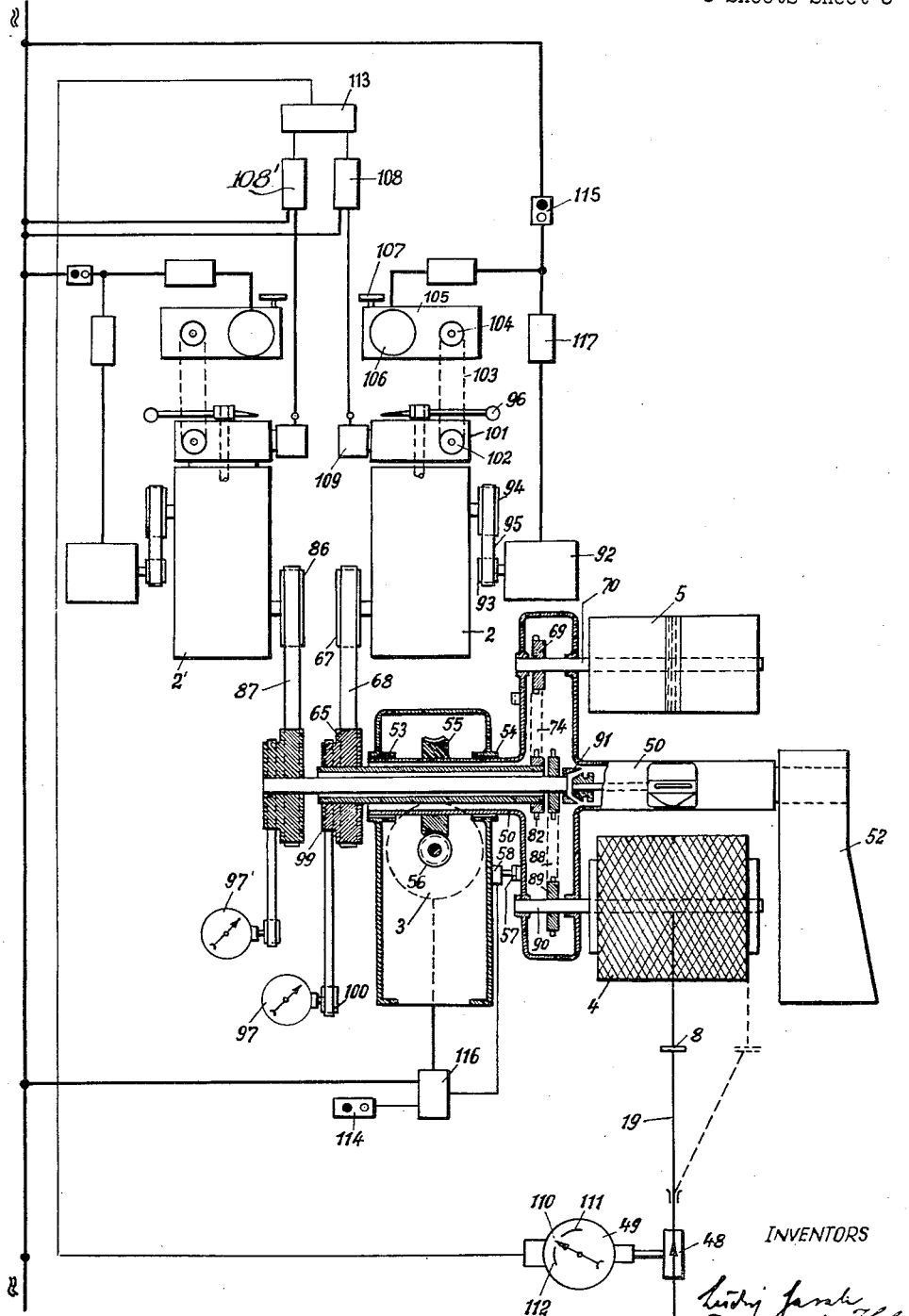

Fig. 1 is a diagrammatic side view of a winding machine having the invention applied thereto, Fig. 2 is a plan view thereof, Fig. 3 is a plan view of a bobbin adapted for use in connection with the winding machine according to the present invention, Fig. 4 is a fragmentary sectional view thereof, Fig. 5 is a side view similar to Fig. 1, but showing the cable in the moment after the cutting action, Fig. 6 is a plan view thereof, Fig. 7 is a side view showing a detail, Fig. 8 is a top view thereof, Fig. 9 is a detail of Fig. 8, drawn on an enlarged scale, Fig. 10 is a section on line XIII—XIII of Fig. 5, Fig. 11 is a section on line XIV—XIV of Fig. 10, Fig. 12 is a diagrammatic side view of a spinning plant having the invention applied thereto, Fig. 13 is an axial section through the pivoted carrier frame for the winding carriers, in a vertical position of the carrier frame, and Fig. 14 is a diagrammatic view illustrating the speed regulation.

Similar reference numerals denote similar parts in the defferent views.

General arrangement

The filaments 41, Fig. 12, are extruded from a large number of spinnerets 42 in the form of multifil structures, passed through chutes 43, deflected by deflecting rollers 44, and combined in the form of a tow 19 which is passed through a pair of preliminary delivery rollers 46, 47, guided over a contact roller 48 of a tachometer 49 and a thread guide 8 cooperating with a holding down bar or roller 9, and wound up on a winding drum 4 or 5 in the form of a bank-wound or cross-wound coil, depending on the adjustment of the control mechanism 7 of the thread guide 8 which control mechanism is driven from a motor 119 through a gear 118, Fig. 2.

The drums 4 and 5 are provided with special means intended to ensure a smooth transfer of the cable from the full to the empty bobbin. A wedge-shaped groove as shown at 10a in Figs. 3 and 4 might serve this purpose, but it has been found that a more reliable transfer can be achieved by the provision on the bobbin winding surface of card clothing means 13, 14, Figs. 7–9 and 13, whose operation will be hereinafter described in greater detail.

It will be understood that it is extremely important, in order to avoid interruptions of the spinning process which would cause great disturbances and non-uniformities, that the tow is transferred to the empty bobbin 5 immediately when the bobbin 4 is full. The tow is running at a speed of more than 500 meters per minute so that a considerable amount of kinetic energy is accumulated in the tow and in the coils wound on the drums, in view of the high weight of 80 kgs. and more of the coils. A particular difficulty, moreover, arises from the fact that the tow is still in a relatively soft condition, so that it is liable to tearing and undue stretching during the changing and winding process. The winding and transfer means and their drive, therefore, must fulfill special requirements.

Drum carrier

Referring more particularly to Fig. 13 in connection with Figs. 1 and 2, it will be seen that the hollow drum carrier 1 is mounted on a hollow shaft 50 mounted for rotation in a bearing 51 of a bearing stand 52 and bearings 53, 54 of a gear casing 6. A worm wheel 55 fixedly secured on the shaft 50 meshes with a worm 56 on the shaft of a motor 3 which can be automatically stopped, in the two end positions of the drum carrier which are displaced against each other by 180°, as will be hereinafter described, by cooperation of a cam ring 57 with a push-button-operated cut-out 58. Mounted for rotation in shaft 50 is a second hollow shaft 17, by means of ball bearings 59 and 60 together with mounting, packing, and spacing rings 61, 62, 63, and 64. Chain wheels 65 and 66 are fixedly mounted on the opposite ends of shaft 17. Chain wheel 65 is driven from a so-called "power-infinitely variable" or "p. i. v." gearing 2, Figs. 2 and 14, through a chain wheel 67 and chain 68, while chain wheel 66 through a chain 74 drives a further chain wheel 69 fixedly mounted on a drum shaft 70 which is mounted for rotation in ball bearings 71 and 72, Fig. 13. Ball bearing 71 is seated in a flanged sleeve 73, while ball bearing 72 is held in a conically projecting flanged support 75, by a cover 76, the support 75 being secured by its flange 77 on the hollow drum carrier 1. The drum 5 can be mounted on shaft 70 by means of a cylindrical supporting member 78 and a conical end disc 79 which can be pressed against the end edge of the drum by means of a threaded hand wheel 80 engaging a male thread 81 on the end of shaft 79.

Rotatably mounted within the hollow shaft 17, by means of ball bearings 82, 83, is a solid shaft 16 on the opposite ends of which are mounted chain wheels 84 and 85, respectively, the chain wheel 84 being driven from a p. i. v. gearing 2', through a chain wheel 86 and a chain 87, while the chain wheel 85 drives, through a chain 88, a further chain wheel 89 fixedly mounted on a drum shaft 90 on which the drum 4 is mounted in the same manner as hereinbefore described with reference to drum 5.

Cutting apparatus

The cutting apparatus will now be described with special reference to Figs. 10 and 11 in connection with Fig. 13. Helical gears 20 and 21 mounted on shafts 22 and 23 are driven by a helical gear 18, by a shaft 15 which is connected to shaft 16 by a coupling 91, Fig. 13. A pair of cutter discs 24 and 25, mounted on shafts 26 and 27 operated from shafts 22 and 23 through bevel wheels 28, 29, or 30, 31, are housed in casings 32, 33 whose position in the main gear casing 34 can be varied by rack and pinion drives 35, 36 to adjust the proper position of the cutter disc as will be hereinafter described. Each casing is formed with a recess 37, or 38, exposing the cutter disc 24, or 25, and forming a catching groove for the cable as will be hereinafter described, guide surfaces 39, 40 serving to guide the cable into said catching groove 37, or 38. The height of the cutter discs is adjusted in such a way that the cutter disc 25 will reach the cable 19 only when the same has been deflected from its straight line direction by the upwardly swinging drum 5. As shown in Figs. 7-9 and 13, the central part of the periphery of the drums 4 and 5 is covered with a card clothing or wire brush surface 13 including a large number of card staples or wires 14 which in the first phase of the transfer operation engage and disengage the cable, as long as the same is still uncut and being wound on drum 4. Thus, only a combing action is exerted in this phase. On the contrary, when the cutter disc 25 rotating at a high speed reaches the cable 19 as the swinging operation continues and severs the cable from the full bobbin 4, the slack end thereof will get entangled with the spiny projections 14 of the bobbin 5 and thus be wound immediately on bobbin 5. It will be appreciated that a safe transfer and gripping is ensured in this way without requiring any synchronisation between the cutting and gripping actions except for the proper adjustment of the cutter heads 32 and 33 to be effected once and for all as the winding apparatus is set for a new type of drum and/or length or thickness of cable to be wound thereon.

Control and synchronisation

The control and synchronization will now be described with special reference to Fig. 14. The p. i. v. gearing 2 is driven from a motor 92 through chain wheels 93 and 94 and a chain 95. The speed of the p. i. v. gearing can be adjusted by three different controls:

First, by a lever 96 for adjusting the initial speed with empty drum 5, whose peripheral speed in this case is indicated by a tachometer 97 which is driven through a belt 98 and belt pulleys 99 and 100.

Secondly, by a cam disc (not shown) provided in the casing 101 and being driven, through a chain wheel 102, a chain 103 and a chain wheel 104 from a second p. i. v. gearing 105 which is driven by a motor 106 and can be adjusted as to its speed by a hand wheel 107.

Thirdly, by the tachometer 49 which is provided with adjustable maximum and minimum contacts 111, 112 for operating a relay switch 108 controlling a motor 109 which is adapted to correct the adjustment of the p. i. v. gearing 101 in such a way that the pointer 110 of the tachometer is moved back to its neutral position between the contacts 111 and 112.

A changeover switch 113 serves to connect the contacts 111 and 112 to the relay switch 108 or 108' in dependence upon the position of the drum carrier 1, through intermediation of the cam ring 57 and switch 58. Additional switches 114 and 115 serve to start the motors 3 and 92, through relays 116 and 117, respectively, but can be replaced by automatic means controlled from switch 58, if desired.

Identical control and synchronisation means for the drive of drum 4 are shown on the left hand side of Fig. 14, symmetrically to those for drum 5, and have not been marked with reference numerals, for the sake of clarity. The construction of the mechanical and electrical control means is known per se and, therefore, need not be illustrated or described in greater detail.

Operation

The operation of the plant is as follows:

When starting operation, the single multifil filaments are passed by hand over the deflection rollers 44 to the preliminary delivery rollers 46, 47 for forming the complete cable 19 which is then passed over the contact roller 48 to, say, drum 4 which previously had been started by operation of its switch (115', Fig. 14) and adjusted in such a way that the peripheral speed of the drum 4, as measured by the tachometer 97', is in strict accordance with the speed of delivery of the spinnerets 42, which can be measured at the deflecting rollers 44. The card clothing 13 will grip the tow 19 which thus will be wound up on the drum and moved to and fro by the thread guide 8 which is moved by its driving gearing 7 which in turn is driven through a gearing 118 from a motor 119. The speed regulation wlil be hereinafter described in greater detail in connection with the drum changing and tow transferring operation. In order to prepare the transfer operation, the driving means of drum 5 are started by depression of push button 115 and adjusted to the predetermined peripheral speed of drum 5 by operating the lever 96 and reading the tachometer 97 which must be in strict accordance with the speed of the tow measured at 49. The lever 96 operates the above mentioned cam disc (not shown) in casing 101 whereby the initial speed of the p. i. v. gearing 2 is set accordingly in per se known manner. Furthermore, by operating the hand wheel 107 the speed of the second p. i. v. gearing 105 is adjusted so that with due consideration of the speed of motor 106 the cam disc in casing 101 will be rotated with such a speed that its control curve will carry out its complete travel past a feeler roller (not shown) controlled thereby, during the time which according to the computations is required for winding the required number of turns on the drum 5. The feeler roller controls the p. i. v. gearing 2. Now, the push-button switch 114 will be operated for turning the drum carrier 1 through 180° by cooperation of relay 116, motor 3, worm 56, worm wheel 55, shaft 50 and carrier 1. When the 180° position has been reached, the switch 58 will be operated by the cam ring 57 and stop the motor 3 through relay 116. During the last phase of the swinging operation, as hereinbefore described, the tow had been engaged comb-fashion by the card clothing 13 of drum 5, Figs. 7 to 9. Now, as the rotary cutter disc 25, Figs. 3 and 8, reaches the tow 19, the same is cut through and entangled with the spikes 14 of the card clothing, whereby it is gripped and wound up on drum 5 which previously had been accurately adjusted to the required peripheral speed as hereinbefore described. The further speed control of the p. i. v. gearing 2 is now effected by the cam disc in the casing 101 of the master programmer. Moreover, the contacts 111 and 112 of tachometer 49 are adjusted in such a way, if necessary, that the pointer 110, or its contact member, respectively, is in the medium position between their inner ends if the tow is wound up with the required speed, i. e., if the tension therein is normal. Thus, if for some reason or other the speed of drum 5 is lower or higher, i. e. if the tow is too slack or too tight, the contact member of pointer 110 will make contact with either of the contact members 111 or 112, and cause the servo motor 106 to rotate in one or the other direction, through the relay 108, whereby the p. i. v. gearing 2 will be additionally readjusted through chain wheel 104, chain 103 and chain wheel 102, until the pointer 110 disengages the respective contact member 111 or 112, by increase or decrease of the speed of drum 5, as the case may be.

It will be understood that while an accurate control of the speed of the drums 4 and 5 during the changing and winding operations is very important in order to avoid tearing and non-uniform or undue stretching of the filaments, such speed control may also be achieved by other means. For instance, the contact tachometer 49 may effect the entire control, without the additional control by the cam disc and the second p. i. v. gearing 105, or the first p. i. v. gearing may also be omitted and the contact tachometer instead may control the speed of the motor 92 by electrical means. In practice, however, the arrangement as shown proved to be most reliable.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

We claim:

1. A non-stop transfer winding apparatus for the continuous coiling of thick tows consisting of substantially parallelly directed, endless synthetic filaments delivered at a high rate of speed of more than 500 meters per minute, comprising a bearing frame, a winding drum carrier mounted for rotation in the bearing frame, a pair of winding shafts rotatably mounted in said carrier symmetrical and parallel to the axis of rotation of the drum carrier, means for separately rotating and stopping said shafts, winding drums adapted to be put on the shafts for alternate operation and rotation therewith, rotary cutting means arranged so that their cuttings edges engage the length of tow freely running between the full drum and the empty drum while the tow in the course of the rotation of the winding drum carrier is still being wound up and held under tension by the full winding drum and in slipping engagement with the empty drum, and adhesion-increasing means on the periphery of each of the drums adapted to permit slipping engagement of the non-severed tow and to take the severed tow end round the empty drum.

2. A non-stop transfer winding apparatus for the continuous coiling of thick tows consisting of substantially parallelly directed, endless synthetic filaments delivered at a high rate of speed of more than 500 meters per minute, comprising a bearing frame, a winding drum carrier mounted for rotation in the bearing frame, a pair of winding shafts rotatably mounted in said carrier symmetrical and parallel to the axis of rotation of the drum carrier, means for separately rotating and stopping said shafts, winding drums adapted to be put on the shafts for alternate operation and rotation therewith, a pair of rotary cutters mounted on the drum carrier in such opposite positions that the respective rotary cutter engages the length of tow freely running between the full drum and the empty drum while the tow in the course of the rotation of the winding drum carrier is still being wound up and held under tension by the full winding drum and in slipping engagement with the empty drum, and adhesion-increasing means on the periphery of each of the drums adapted to permit slipping engagement of the non-severed tow and to take the severed tow end round the empty drum.

3. A non-stop transfer winding apparatus for the continuous coiling of thick tows consisting of substantially parallelly directed, endless synthetic filaments delivered at a high rate of speed of more than 500 meters per minute, comprising a bearing frame, a winding drum carrier mounted for rotation in the bearing frame, a pair of winding shafts rotatably mounted in said carrier symmetrical and parallel to the axis of rotation of the drum carrier, means for separately rotating and stopping said shafts, winding drums adapted to be put on the shafts for alternate operation and rotation therewith, cutting means including a hub fixedly mounted on the drum carrier, two arms extending from said hub in opposite directions, a rotary cutter mounted for rotation on the extreme end of each arm, means for driving said rotary cutters, a casing partly enclosing each cutter and comprising guiding means for catching the tow in a recess exposing the cutter and forming a stop surface holding the tow against the cutting pressure exerted by the cutter, each of said cutters being arranged in such a position that its cutting edge engages the length of tow freely running between the full drum and the empty drum while the tow in the course of the rotation of the winding drum carrier is still being wound up and held under tension by the full winding drum and in slipping engagement with the empty drum, and adhesion-increasing means on the periphery of each of the drums adapted to permit slipping engagement of the non-severed tow and to take the severed tow end round the empty drum.

4. A non-stop transfer winding apparatus for the continuous coiling of thick tows consisting of substantially parallelly directed, endless synthetic filaments delivered at a predetermined high rate of speed of more than 500 meters per minute, comprising a bearing frame, a winding drum carrier mounted for rotation in the bearing frame, a pair of winding shafts rotatably mounted in said carrier symmetrical and parallel to the axis of rotation of the drum carrier, means for separately rotating and stopping said shafts, winding drums adapted to be put on the shafts for alternate operation and rotation therewith, a roller engaging the tow before it reaches the winding drum, a tachometer measuring the speed of the roller and including means for regulating the speed of the operative winding drum in such a way that the effective linear winding speed of the drum differs by not more than a predetermined small tolerance from said predetermined speed, severing means which do not partake in the rotation of the winding drums about their axes and are adapted to sever the length of tow freely running between the full drum and the empty drum while the tow in the course of the rotation of the winding drum carrier is still being wound up and held under tension by the full winding drum and in slipping engagement with the empty drum, and adhesion-increasing means on the periphery of each of the drums adapted to permit slipping engagement of the non-severed tow and to take the severed tow end round the empty drum.

5. A non-stop transfer winding apparatus for the continuous coiling of thick tows consisting of substantially parallelly directed, endless synthetic filaments delivered at a predetermined high rate of speed of more than 500 meters per minute, comprising a bearing frame, a winding drum carrier mounted for rotation in the bearing frame, a pair of winding shafts rotatably mounted in said carrier symmetrical and parallel to the axis of rotation of the drum carrier, means for separately driving and stopping said shafts, winding drums adapted to be put on the shafts for alternate operation and rotation therewith, a separate infinitely variable gearing between said driving means and each of said shafts, means for manually adjusting the infinitely variable gearing so as to match the peripheral speed of the empty drum to said predetermined speed of the tow, a roller engaging the tow before it reaches the winding drum, a tachometer measuring the speed of the roller and having a first adjustable contact adapted to be operated if the tachometer indication surpasses the maximum admissible plus deviation of the speed of the roller from the predetermined speed of the tow, a second adjustable contact adapted to be operated if the tachometer indication surpasses the maximum admissible minus deviation of the speed of the roller from the predetermined speed of the tow, and servomotor means controlled by said adjustable contacts and adapted to readjust the infinitely variable gearing so as to restore said predetermined speed, severing means which do not partake in the rotation of the winding drums about their axes and are adapted to sever the length of tow freely running between the full drum and the empty drum while the tow in the course of the rotation of the winding drum carrier is still being wound up and held under tension by the full winding drum and in slipping engagement with the empty drum, and adhesion-increasing means on the periphery of each of the drums adapted to permit slipping engagement of the non-severed tow and to take the severed tow end round the empty drum.

6. A non-stop transfer winding apparatus for the continuous coiling of thick tows consisting of substantially parallelly directed, endless synthetic filaments delivered at a predetermined high rate of speed of more than 500 meters per minute, comprising a bearing frame, a winding drum carrier mounted for rotation in the bearing frame, a pair of winding shafts rotatably mounted in said carrier symmetrical and parallel to the axis of rotation of the drum carrier, means for separately driving and stopping said shafts, winding drums adapted to be put on the shafts for alternate operation and rotation therewith, a separate infinitely variable gearing between said driving means and each of said shafts, means for manually adjusting the infinitely variable gearing so as to match the peripheral speed of the empty drum to said predetermined speed of the tow, means for automatically readjusting the infinitely variable gearing during the winding operation so as to gradually reduce the speed of the operative winding drum in accordance with the increasing diameter of the coil wound thereon, a roller engaging the tow before it reaches the winding drum, a tachometer measuring the speed of the roller and having a first adjustable contact adapted to be operated if the tachometer indication surpasses the maximum admissible plus deviation of the speed of the roller from the predetermined speed of the tow, a second adjustable contact adapted to be operated if the tachometer indication surpasses the maximum admissible minus deviation of the speed of the roller from the predetermined speed of the tow, relay means adapted to be operated by said contacts, and servomotor means for readjusting the infinitely variable gearing so as to restore said predetermined speed, said servomotor means being controlled by said relay means, severing means which do not partake in the rotation of the winding drums about their axes and are adapted to sever the length of tow freely running between the full drum and the empty drum while the tow in the course of the rotation of the winding drum carrier is still being wound up and held under tension by the full winding drum and in slipping engagement with the empty drum, and adhesion-increasing means on the periphery of each of the drums adapted to permit slipping engagement of the non-severed tow and to take the severed tow end round the empty drum.

References Cited in the file of this patent
UNITED STATES PATENTS

| | | |
|---|---|---|
| 1,040,188 | Gray | Oct. 1, 1912 |
| 1,806,851 | Hamel | May 26, 1931 |
| 1,954,956 | Sippel | Apr. 17, 1934 |
| 1,988,437 | Brillhart et al. | Jan. 22, 1935 |
| 2,081,331 | Hathaway | May 25, 1937 |
| 2,200,000 | Johnstone | May 7, 1940 |
| 2,296,339 | Daniels | Sept. 22, 1942 |
| 2,317,152 | Costa | Apr. 20, 1943 |
| 2,321,646 | Blodgett | June 15, 1943 |
| 2,585,226 | Christman | Feb. 12, 1952 |